United States Patent
Snip et al.

(10) Patent No.: US 6,888,932 B2
(45) Date of Patent: May 3, 2005

(54) METHOD AND SYSTEM FOR ACTIVATION OF A LOCAL TERMINAL

(75) Inventors: Jan Gerard Snip, TC Zoeterwoude-Dorp (NL); Arnoldus Johannes Paulus Rancuret, Eg The Hague (NL); Hendrik Antonius Bernard Van De Vlag, HJ The Hague (NL); Marc-Jan Bastiaansen, RM Rijswijk (NL); Wilbert Ludovicus Johanna Maria De Graaf, DH Almelo (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 10/069,608

(22) PCT Filed: Aug. 29, 2001

(86) PCT No.: PCT/EP01/09988

§ 371 (c)(1),
(2), (4) Date: May 24, 2002

(87) PCT Pub. No.: WO02/19627

PCT Pub. Date: Mar. 7, 2002

(65) Prior Publication Data

US 2002/0164005 A1 Nov. 7, 2002

(30) Foreign Application Priority Data

| Aug. 30, 2000 | (NL) | 1016053 |
| Sep. 13, 2000 | (NL) | 1016167 |
| Jan. 24, 2001 | (NL) | 1017189 |

(51) Int. Cl.$^7$ .......................................... H04M 11/00
(52) U.S. Cl. ................ 379/93.24; 379/90.01; 709/206
(58) Field of Search ............. 379/93.24, 90.01, 379/93.02, 93.05, 93.06, 93.07, 93.08, 93.09, 88.11, 88.12, 88.13, 88.17; 709/206

(56) References Cited

U.S. PATENT DOCUMENTS

| 4,713,837 A | * 12/1987 | Gordon ................ 379/106.07 |
| 5,737,400 A | 4/1998 | Bagchi et al. |
| 5,809,118 A | 9/1998 | Carmello et al. |
| 6,067,561 A | * 5/2000 | Dillon ........................ 709/206 |
| 6,333,973 B1 | * 12/2001 | Smith et al. ............. 379/88.12 |

FOREIGN PATENT DOCUMENTS

| EP | 0 736 989 A2 | 10/1996 |
| EP | 0 836 301 A1 | 4/1998 |
| WO | WO 99/35805 | 7/1999 |

OTHER PUBLICATIONS

Randall; Communication network and communication device; Sep. 5, 1991; WO 91/13510.*

* cited by examiner

*Primary Examiner*—Melur Ramakrishnaiah
(74) *Attorney, Agent, or Firm*—Michaelson & Associates; Peter L. Michaelson; Alberta A. Vitale

(57) ABSTRACT

System and method for activating a terminal (7) connectable to a first network (1). An activation module (6) is connected to a second network (5) on the one hand and to the terminal on the other hand and can activate the terminal after receiving an activation code. The activation module might also activate a connection between the terminal and the server, while the server might further activate the terminal. If the second network (5) passes on to the activation module (6) an identifier (e.g. CLI) of the node via which the server (2) connects to the second network, the activation module can activate the terminal in various ways in accordance with the value of the recorded identifier. The server (2) can connect to the network via nodes with various identifiers. The activation code can also comprise notification messages or other messages (for example SMS), which the server (2) sends directly to the user terminal (7) via the activation module (6).

45 Claims, 5 Drawing Sheets

METHOD AND SYSTEM FOR ACTIVATION OF A LOCAL TERMINAL

FIELD OF THE INVENTION

The invention relates to a method and a system for activating a local terminal connectable to a first network.

BACKGROUND AND PROBLEM DEFINITION

It is known that the server of, for example, an "Internet Service Provider" (ISP) can announce to a user who is logging in or has already logged in that there is new e-mail, news, or other items for that user. Another possibility is that the user, after logging in to the server, asks if any new items have arrived. Alternatively, an ISP or other server can activate the local terminal in some other way. For example, the ISP can update software or databases present in the terminal, send out recent news reports, etc.

All this is, however, only possible if there is an actual connection with the server. If a user wishes to be notified as soon as any new mail etc. arrives on the server, this is only possible if there is a continuous or very frequently established connection with the server. If the connection runs via e.g. a PSTN or an ISDN connection, which is not usually continuously open, this means that the user must regularly establish a connection in order to check whether any mail, messages, updates, etc. are present on the server. Since this will often not be the case, however, this procedure is both inefficient and costly both for the users and for the service provider. Of course, keeping a connection open continuously is even more expensive for residential and small business users.

SUMMARY OF THE INVENTION

In order to overcome the above-mentioned problems, the invention provides a method and a system whereby—in brief—a "Non-permanently Accessible Terminal" (NAT) is activated by a server via a "Permanently Accessible Terminal" (PAT).

The method for the activation of a local ("Non-permanently Accessible") terminal connectable to a first network can comprise, according to the invention, the following steps:

1.a. the server transmits via a second network an activation code to a local ("Permanently Accessible") activation module which is connected to the second network on the one hand and to the local terminal on the other hand;

1.b after receiving an activation code, the activation module activates the terminal.

On receiving the activation code, the PAT, which is permanently accessible via the first network (e.g. PSTN or ISDN), "wakens", as it were, the NAT, which is not permanently accessible via the first network (e.g. the internet). After having been "awoken", the NAT can perform further actions, depending on how the NAT is programmed. The activation module or PAT can, for example, activate a connection, via the first network, between the local terminal or NAT and the server, after which the server can in turn further activate the terminal or NAT.

The activation by the PAT can also be made dependent on the "Calling Line Identifier" (CLI) or other node identifier which the server uses in its connection with the activation module.

If the second network passes on to the activation module the CLI of the node via which the server connects to the second network, the activation module records the CLI and activates the terminal in accordance with the value of the recorded CLI. Thus the CLI value received by the PAT here determines the behaviour of the NAT.

For activation of the NAT in a variety of ways, the server can connect to the second network via various nodes with different CLIs, which can enable the server to set the behaviour of the NAT, activated via the PAT, by specifically using either one or the other network node of e.g. the PSTN or ISDN.

The PAT can be implemented as hardware (a box) as well as software (on a computer, that might be the NAT) as long as it is able to be connected to the second network and to receive the activation code of the server. If the PAT is software implemented and the user does not have his device on which the software runs (e.g. the NAT) on then it is of no use to send an alert. One way to deal with this problem is to allow the end user to configure during which times he wishes to receive alerts. It is then the responsibility of the end user to ensure that the PC is on during these times in order to receive the alerts. Another option is that the user can toggle his virtual online status with one mouse click. A call is then made from the end user to the call server which uses CLI to identify the end user. The virtual online status of the end user can then be toggled from virtual online to virtual offline, or vice versa. In this way the end user can signal when he is ready to receive alerts and when not. The platform will keep track of the virtual online status and will only send alerts if the user is virtually online.

The NAT might be any kind of apparatus such as a personal computer, a laptop, a phone (wired as well as wireless) etc. as long as it is able to receive activation signals or code from the PAT and can be connected to the first network.

The activation code can, in addition to the activation code itself, also comprise a message that is sent by the server to the activation module and that can be read by the terminal, after having been activated, independently of whether the terminal is connected to the second network or not. A message of this kind could be a notification message to the effect that, for example, a (longer) message, e.g. an SMS or e-mail message, is waiting in the server to be read by the user of the terminal. It is not, however, necessarily a notification message (indicating the presence of a longer message in the server); the activation code can also comprise a complete message (for example an SMS). This option is particularly applicable if the first network is an ISDN network. The user can read the message as soon as the terminal has been activated, without first having to make a connection to the second network (e.g. the internet). The invention will now be described in more detail with reference to a working example of a system architecture which is suitable for performing the method according to the invention.

DESCRIPTION

Figure 1:
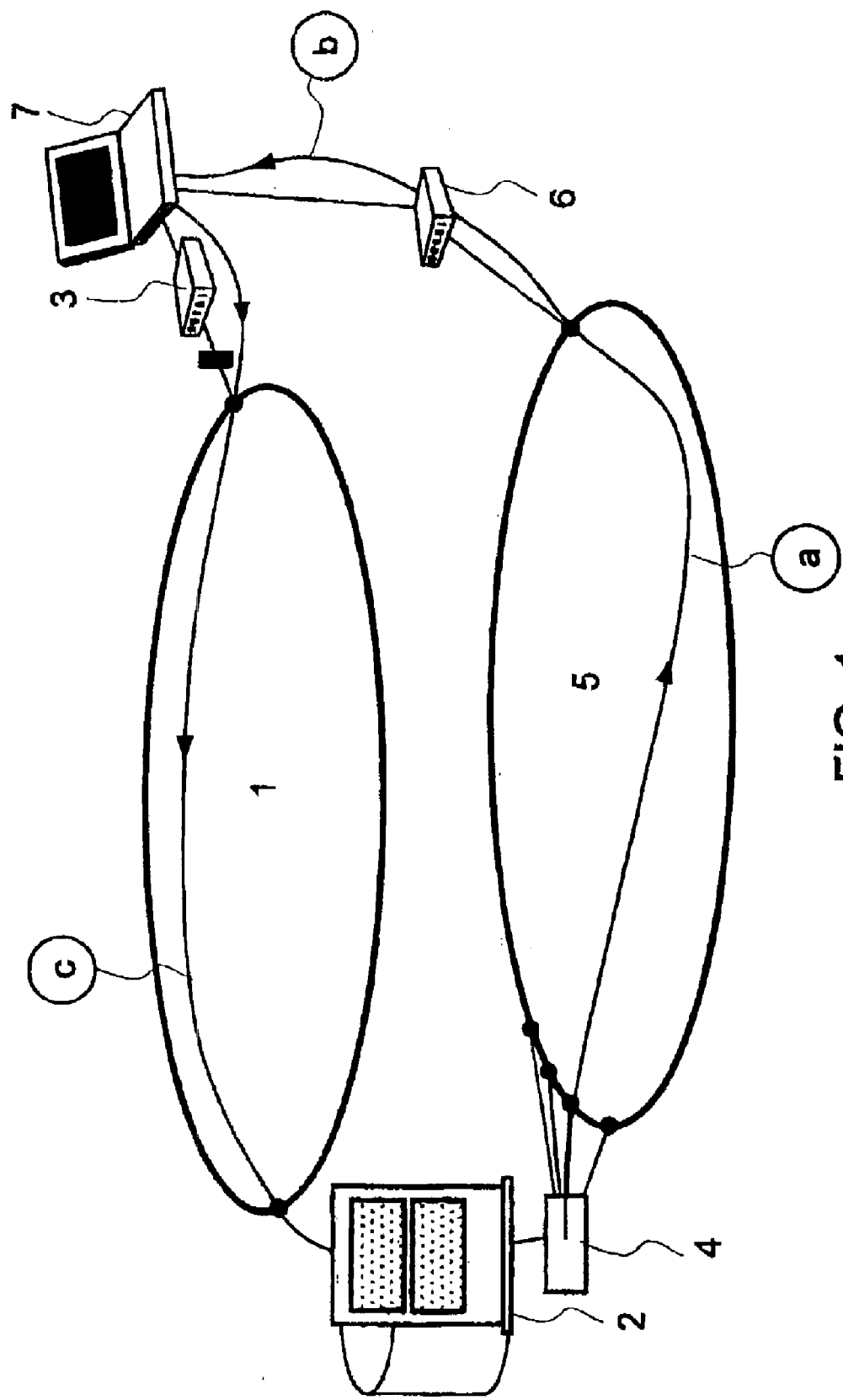
FIG. 1 shows a schematic example of the system architecture according to a first embodiment of the invention.

For the purpose of teaching the invention, preferred embodiments of the method and devices of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted. FIG. 1 shows a system for activating a local "Non-permanently Accessible" terminal 7 connectable to a first network 1, e.g. the internet. A local "Permanently Accessible" activation module 6 is connected to a second network 5 (e.g. PSTN or ISDN) on the one hand and to the local terminal 7 on the other hand, which activation module, after receiving an activation code (a), activates the terminal 7 (b). This activation can refer to a variety of things, for example control via the terminal of (household) equipment, etc. (see FIG. 3). In particular, however, the activation module 6 (subsequently) activates a connection between the local terminal 7 and a server 2 (c) via the first network 1, which server 2 further activates or controls or communicates with the terminal. The second network 5 passes on to the activation module 6 the identifier ("Calling Line Identifier"—CLI) of the node via which the server 2 connects to the second network. The activation module 6 records this identifier (CLI) and activates the terminal 7 in accordance with the value of the CLI.

The server 2 comprises means, represented by selection means 4, for—via various network nodes, each with different identifiers (CLIs)—connecting to the second network, with the aim of activating the activation module 6 and indirectly the terminal 7 in various ways, in accordance with the value of the CLI recorded by the activation module.

The first network 1 and the second network 5 can in principle be completely separate networks. The first network 1 and the second network 5 can, however, also belong (in part) to the same network. In general, this latter possibility is usually the case: for residential use, the internet 1 is usually accessed via a PSTN or ISDN connection, via a PSTN or ISDN modem 3 and an ISP.

Figure 2:
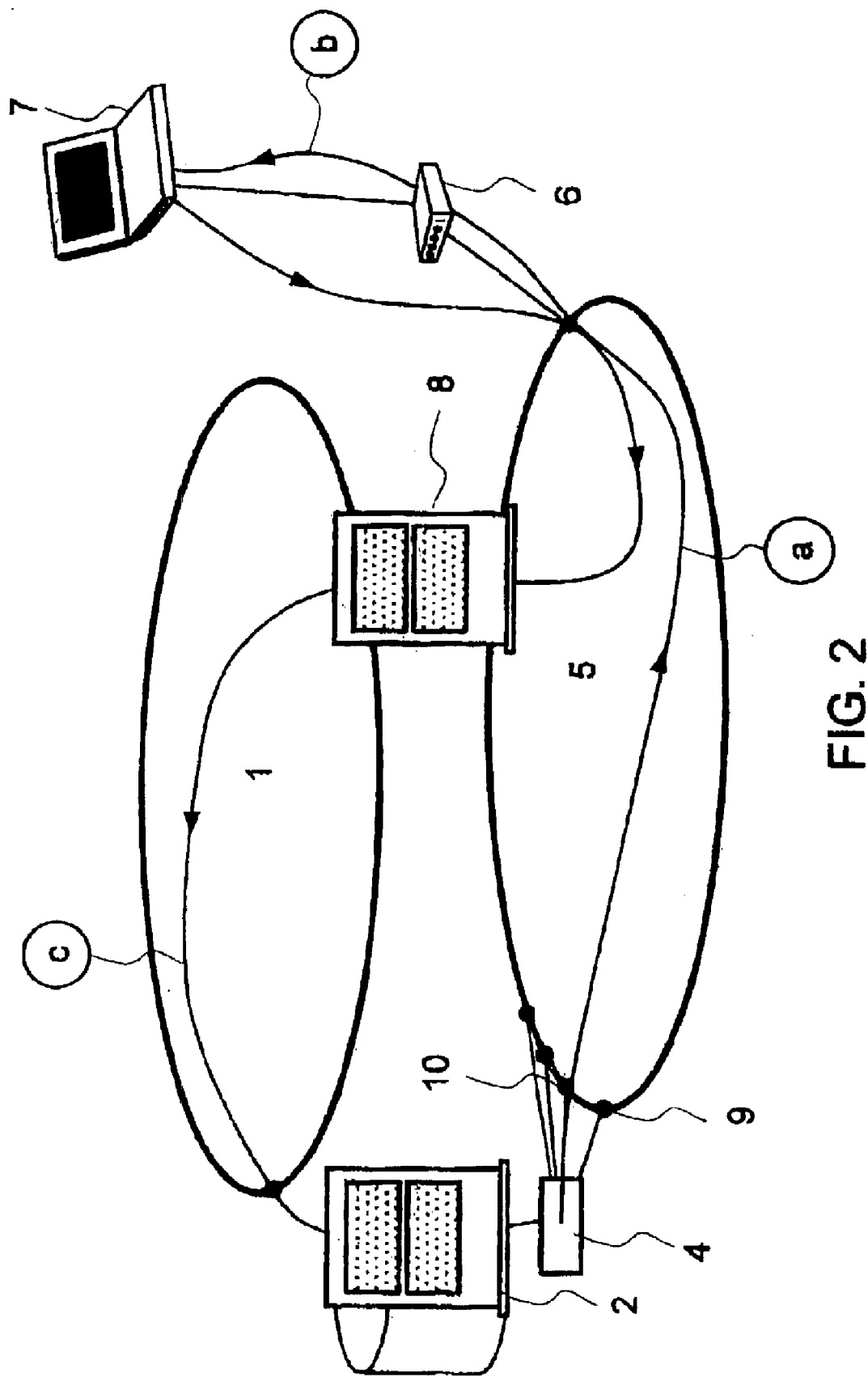
FIG. 2 shows a schematic example of the system architecture including an ISP according to a second embodiment of the invention.

FIG. 2 shows a situation involving an Isp 8. In addition, the modem 3 (see FIG. 1) and the activation module 6 are combined into one unit incorporating both functions. The operation is preferably identical to that of FIG. 1; the connection between the server 2 and the terminal 7, however, runs via an ISP server 8 (see FIG. 2) connected to the PSTN or ISDN on the one hand and to the IP network 1 on the other hand, which server can be selected by the terminal 7 via the PSTN or ISDN S.

Figure 3:
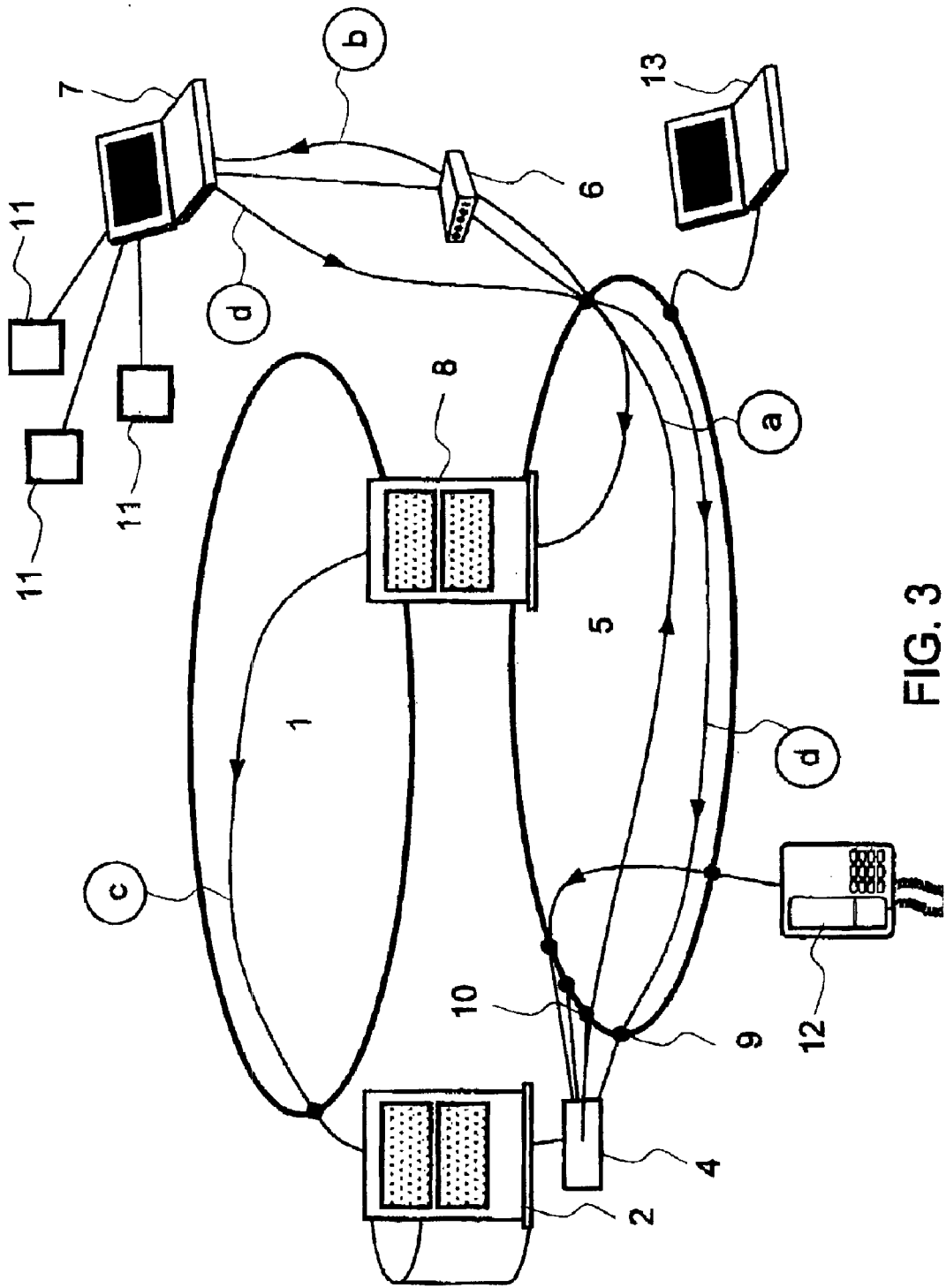
FIG. 3 shows an example of the system architecture including a possible extended application of controlling devices according to a third embodiment of the invention.

FIG. 3 illustrates some additional aspects of the invention. The terminal 7 can be used for controlling e.g. household equipment, represented by devices 11. These devices 11 can be controlled independently by the terminal (PC) 7, but can also be co-controlled from the activation module 6 (which can be set via the CLIs) or a server or external computer connected to the internet 1, for example the server 2. This server 2 can also, in turn, be controlled from, for example, a telephone set 12—via the network 5—or an external terminal 13, enabling the user to connect to the server 2 and pass on control parameters to it, in order thereby to influence the operation of the activation module 6 or the terminal 7.

Via the network 5 the module 6 therefore makes a connection between a terminal 7 and the server 2, for which purpose module 6 comprises means for receiving (not explicitly shown) an activation code (a) from the server 2 and subsequently activating the terminal 7, preferably in accordance with the value of the received activation code. In the embodiment shown, the value of the activation code comprises an identifier (CLI) of the network node 9 used by the server 2. Furthermore, it is also possible that the module 6 comprises means for detecting a terminal-status code (d), relating to the status of the terminal 7, and for passing on this status code via the network 5 to the server 2. In particular, it is envisaged that the status code indicates whether the terminal is active ("ion") or inactive ("off"), so that the server 2 knows whether it can or cannot send a message to the terminal. Such a message has in particular the form of an "alert" or notification message that, after the server 2, on the basis of the latest terminal status code, knows that the terminal 7 is "on", can be sent via the activation module 6 to the terminal 7. Such an "alert" can therefore be sent via the network 5 without the terminal 7 being connected to the first network, e.g. the internet 1. The advantage of this is, amongst other things, that it eliminates the need for the rather lengthy log-in procedure to the ISP 8 for access to the internet, while it is still possible to receive (short) messages from the server 2. These messages can —in particular if the network 5 is an ISDN network —be not only "alert" messages, but also SMS messages, known in particular from mobile telephony. These messages can be sent to the server 2 either by users 12,13 of network 5 or by users of the first network, e.g. the internet 1. The server 2 then sends with the activation code either a notification message or the SMS message itself to the module 6 and via this module to the activated terminal 7.

Figure 4A:
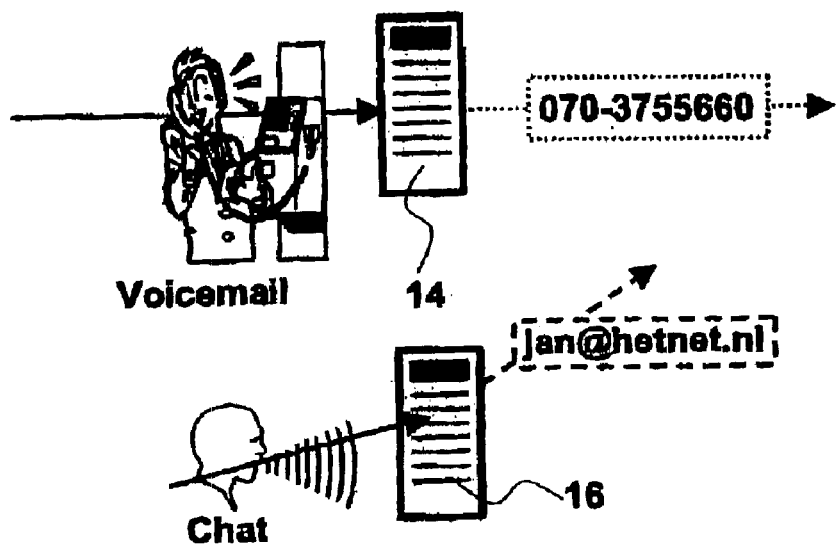
FIGS. 4A–D show a detailed example of elements of an embodiment of a platform according to the invention.
Figure 4B:
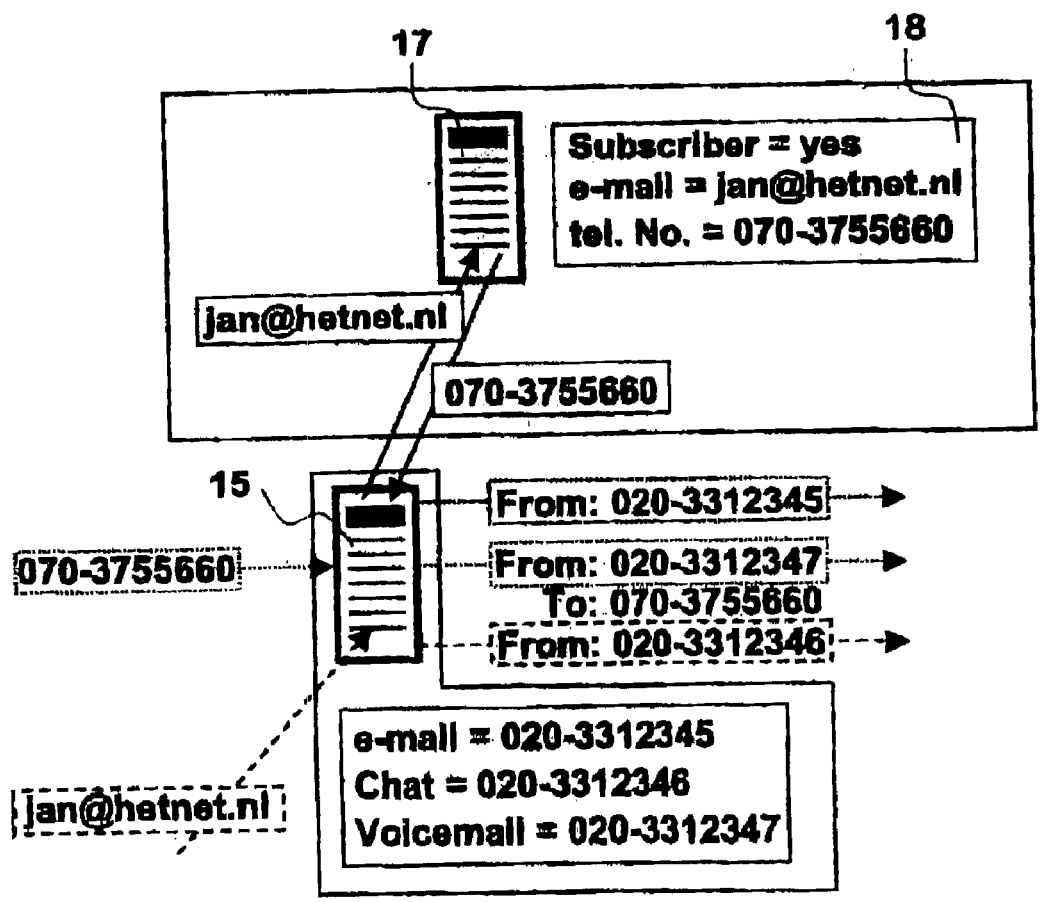
Figure 4C:
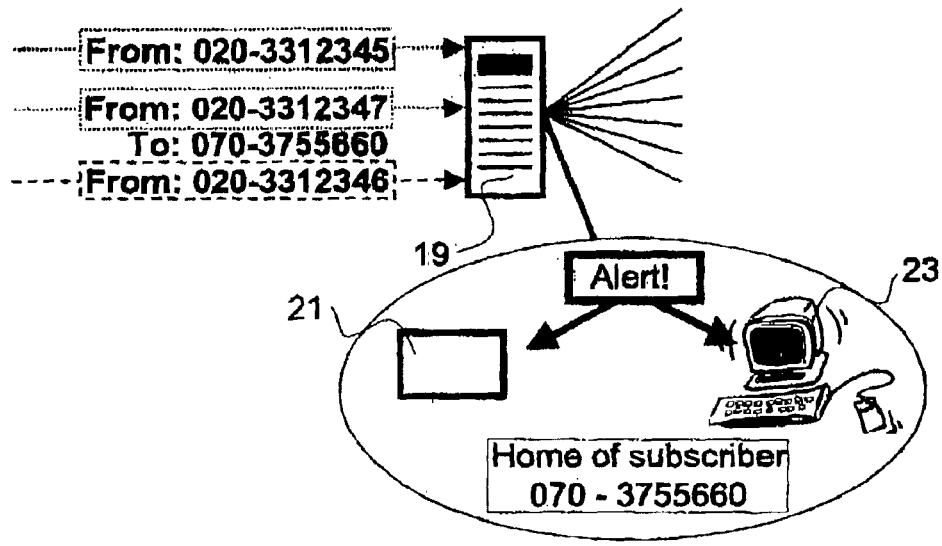
Figure 4D:
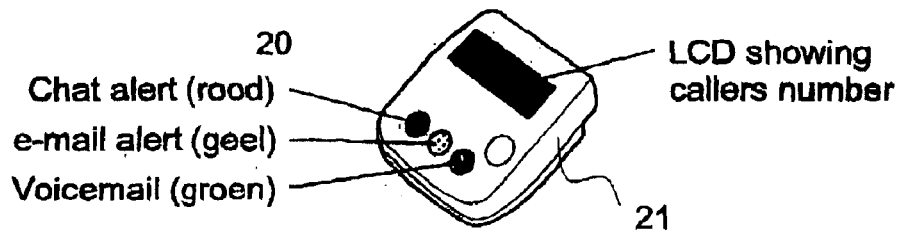
Figure 4D:

An example of the elements of an embodiment of a platform according to the invention will be shown and briefly described in relation to FIG. 4. The platform might comprise the following elements:

1. SMPT server
2. Voicemail server
3. HTTP/chat server
4. Client database
5. Alert server
6. Call server
7. Activation module and/or activation software Some of these elements are shown in the embodiment of the platform in FIGS. 4A–D. Whenever there as a new voicemail waiting for a subscriber to the service according to the invention the voicemail server 14 in FIG. 4A might send the telephone number (e.g. 070-3755660) to the alert server 15 in FIG. 4B. Moreover a chatter might be requesting an off line chat buddy to join in a chat session. The off line chat buddy might be identified by an e-mail address (e.g. jan@hetnet.nl). This e-mail address is forwarded by a chat server 16 in FIG. 4A to the alert server 15. In a client database 17 (FIG. 4B) client information 18 might be stored such as e-mail address, telephone number and whether the client is a subscriber to the service. The alert server 15 translates an incoming alert with e-mail address to the appropriate alert telephone number and client telephone number. For the latter the client database 17 is used. Both telephone numbers are forwarded to a call server 19 as shown in FIG. 4C. The alert telephone number corresponding to an e-mail or chat alert might be configurable. The call server 19 calls to a client telephone number from an alert telephone number and hangs up immediately to avoid incurring call setup charges. Using e.g. the calling line identifier (CLI), the calling (alert) telephone number is identified allowing the appropriate alert message to be displayed, either as a LED 20 on the activation module 21 or as a popup 22 on a pc 23 as shown in FIG. 4D. The activation module 21 might be a caller display device using CLI to identify the callers number. Each LED 20 on the activation module 21 can be programmed to light up in response to a particular caller. The LCD screen might show the caller's number. In addition, the activation module might have voicemail LED which might light up whenever a telephone call is not answered. The popup 22 on the pc 23 might display alert messages in response to certain caller numbers. With e.g. one mouse click users can respond to an alert automatically resulting in the pc 23 going online to the correct webpage. The caller numbers and the corresponding alert messages can be (re) programmed or synchronized by e.g. the ISP when the client is online.

The service or services that might be provided by the method and system according to the invention are, above the services already described above, numerous. To summarise partly and extend these services might comprise amongst other ones:

Filtered e-mail alerts, the end user can specify the senders of e-mail which will trigger an alert and which senders will not.

Web event alerts, the platform according to the invention is suitable for sending alerts to end users for a variety of Internet events such as live concerts, interviews and chat sessions.

Game alerts, end users playing online games can receive alerts in response to interesting game events.

VoIP, according to the invention alerts can facilitate the introduction of the VoIP service allowing end users to 'call' each other.

Personalised alert, end users can specify themselves for which events they wish to receive alerts.

Third party alerts, the operator of the platform according to the invention might allow third parties to develop and deploy new alert services.

Mobile alerts, the platform according to the invention can send alerts to mobile phones.

Screenphone alerts, next generation telephones can be integrated with the alert services according to the invention.

SMS for fixed telephony, the platform according to the invention can be extended to enable SMS messages to be sent to end users over the fixed telephone network.

Home connect, end users can remotely bring their PC online and thus access their files and applications.

Home device control, end users can bring their home environment online and remotely access their household appliances such as videos, washing machines and thermostats.

What is claimed is:

1. A method for activating a local terminal connectable to a first network comprising the steps of:
   selecting by a server, out of a plurality of network nodes with different identifiers for connecting to a local activation module via second network, a network node with an identifier;
   transmitting, by the server and via the second network an activation code with the identifier of the selected network node to the local activation module which is connected to the second network and to the local terminal; and
   activating, by the activation module and after receiving the activation code, the local terminal in accordance with the value of the identifier.

2. The method according to claim 1 further comprising the steps of:
   activating, through the activation module, a connection between the local terminal and the server, via the first network; and
   further activating, by the server, the local terminal.

3. The method according to claim 1 wherein the activation code comprises a message that is sent by the server to the activation module and that can be read by the local terminal after having been activated by the activation module.

4. The method according to claim 3 wherein the message is a notification message.

5. The method according to claim 4 wherein the notification message relates to a message that is waiting in the server to be read by a user of the local terminal.

6. The method according to claim 5 wherein the message waiting in the server is an SMS message.

7. The method according to claim 5 wherein the message waiting in the server is an email message.

8. The method according to claim 4 wherein the notification message is an SMS message.

9. A server comprising selection means for activating a local terminal, in a plurality of ways, connected to a first network by selecting, out of a plurality of network nodes with different identifiers for connecting to a local activation module via a second network, a network node with an identifier.

10. The server according to claim 9 wherein the first network and the second network are separate networks.

11. The server according to claim 9 wherein the first network and the second network are at least partially constituted by a same network.

12. The server according to claim 9 further comprising means for connecting with an external terminal or other server and adapted to be controlled by the external terminal or said other server on the basis of control parameters.

13. A system for activating a local terminal connected to a first network, the system comprising:
    an activation module which is connected to a server via a second network and to a local terminal, wherein:
       the server comprises selection means to select, out of a plurality of network nodes with different identifiers for connecting to the activation module via the second network, a network mode with an identifier and passing an activation code with the identifier of the selected network node to the activation module;
       the activation module records the identifier so as to define a recorded identifier and activates the local terminal, after receiving the activation code, in accordance with a value of the recorded identifier.

14. The system according to claim 13 wherein the activation module is adapted to activate a connection between the local terminal and the server, via the first network, which server further activates the local terminal.

15. The system according to claim 13 wherein the first network and second network are separate networks.

16. The system according to claim 13 wherein the first network and second network are at least partially constituted by a same network.

17. The system according to claim 13 wherein the server comprises means for connecting to an external terminal or other server and is adapted to be controlled by said external terminal or said other server on a basis of control parameters.

18. The system according to claim 13 wherein the local terminal is adapted to control further devices.

19. The system according to claim 18 wherein the further devices are domestic devices.

20. The system according to claim 13 wherein the activation module or said other server are adapted to control further devices.

21. The system according to claim 20 wherein at least one of the activation module and the local terminal are integrated within the further devices.

22. A module for making a connection between a local terminal and a server, via a network, comprising:

means for receiving, from the server, an activation code, the activation code comprising an identifier of a node selected by the server from a plurality of nodes with different identifiers for connecting to the module via the network; and means for recording the identifier, so as to define a recorded identifier, and activating the terminal in accordance with a value of the recorded identifier.

23. The module according to claim 22 wherein the activation code comprises a message and the module comprises means for passing on the message to the local terminal.

24. The module according to claim 22 wherein the message is a notification message that relates to a message stored in the server.

25. The module according to claim 22 wherein the message is an SMS message.

26. The module according to claim 22 further comprising means for detecting a terminal-status code relating to the status of the local terminal and adapted to pass on the status code, via the network, to the server.

27. The module according to claim 26 wherein the status code comprises an indication whether the local terminal is active or inactive.

28. The module according to claim 22 wherein the module is implemented as hardware.

29. The module according to claim 22 wherein the module is implemented as software.

30. A method for activating a local terminal connected to a first network, the method comprising the steps of:

transmitting, by a server and via a second network, an activation code, the code comprising a message to a selected local activation module which is connected to the second network and to the local terminal; and after reception of the activation code by the selected local activation module, activating the local terminal by the selected local activation module wherein the message can be read by the local terminal.

31. A method for activating a local terminal connectable to a first network comprising the steps of:

transmitting, by a server and via a second network an activation code to a local activation module which is connected to the second network and to the local terminal; and activating, by the activation module and after receiving the activation code, the terminal; and wherein the activation code comprises a message that is sent by the server to the activation module and that can be read by the terminal after having been activated by the activation module.

32. The method according to claim 31 wherein the message is a notification message.

33. The method according to claim 32 wherein the notification message relates to a message that is waiting in the server to be read by the user of the terminal.

34. The method according to claim 33 wherein the message waiting in the server is an SMS message.

35. The method according to claim 33 wherein the message waiting in the server is an e-mail message.

36. A system for activating a local terminal connected to a first network, the system comprising:

a local activation module which is connected to a second network and to the local terminal, wherein:

the second network passes on an identifier of a node via which a server is connected to the second network; and the activation module records the identifier so as to define a recorded identifier and activates the terminal, after receiving an activation code, in accordance with a value of the recorded identifier; and wherein the activation code comprises a message and system further comprises means for passing on the message to the terminal.

37. The system according to claim 36 wherein the message is a notification message.

38. The system according to claim 37 wherein the notification message relates to a message that is waiting in the server to be read by the user of the terminal.

39. The system according to claim 38 wherein the message waiting in the server is an SMS message.

40. The system according to claim 38 wherein the message waiting in the server is an e-mail message.

41. A module for making a connection between a local terminal and a server, via a network, comprising:

means for receiving, from the server, an activation code, the code comprising an identifier of a node via which the server is connected to the network; and means for recording the identifier, so as to define a recorded identifier, and activating the terminal in accordance with a value of the recorded identifier; and wherein the activation code comprises a message and the module comprises means for passing on the message to the terminal.

42. The module according to claim 41 wherein the message is a notification message.

43. The module according to claim 42 wherein the notification message relates to a message that is waiting in the server to be read by the user of the terminal.

44. The module according to claim 43 wherein the message waiting in the server is an SMS message.

45. The module according to claim 43 wherein the message waiting in the server is an e-mail message.

* * * * *